June 20, 1933. C. W. P. HEYLANDT Re. 18,876
PROCESS AND APPARATUS FOR TRANSFERRING LIQUEFIED GASES FROM ONE CONTAINER TO ANOTHER
Original Filed March 8, 1929
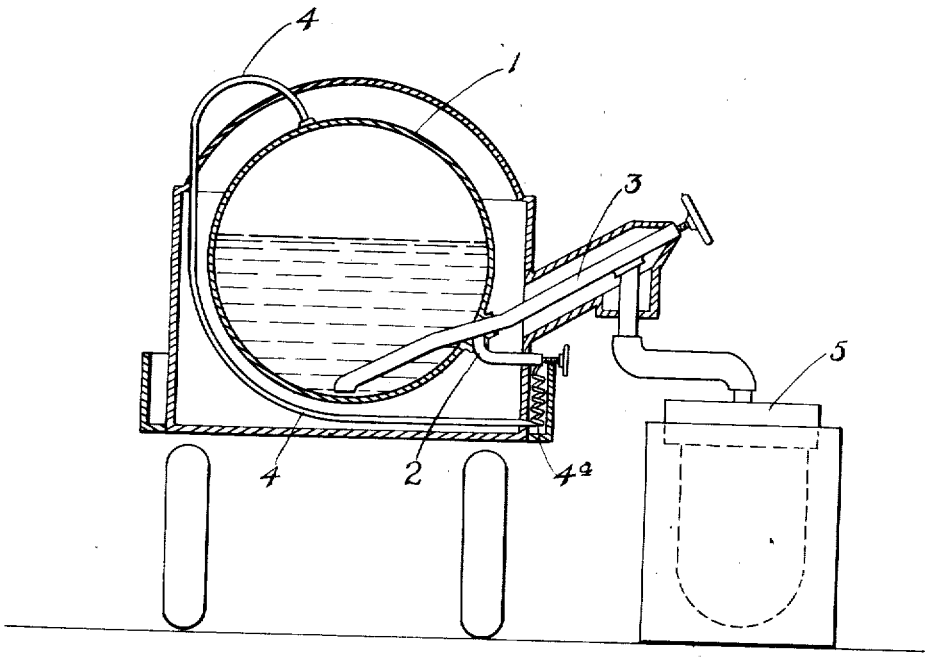
INVENTOR
Christian Wilhelm Paul Heylandt
BY
Watson, Bristol, Johnson & Leavenworth
ATTORNEYS Reissued June 20, 1933 Re. 18,876

UNITED STATES PATENT OFFICE

CHRISTIAN WILHELM PAUL HEYLANDT, OF BERLIN-BRITZ, GERMANY, ASSIGNOR TO FLÜGA AKTIENGESELLSCHAFT, OF ST. MORITZ, SWITZERLAND, A CORPORATION OF SWITZERLAND

PROCESS AND APPARATUS FOR TRANSFERRING LIQUEFIED GASES FROM ONE CONTAINER TO ANOTHER

Original No. 1,753,785, dated April 8, 1930, Serial No. 345,259, filed March 8, 1929, and in Germany March 2, 1928. Application for reissue filed April 5, 1932. Serial No. 603,424.

This invention relates to a process and apparatus for transferring liquefied gases from one container to another and has for its object generally to provide a procedure and apparatus therefor which effects the desired transfer with a relatively small amount of liquid loss by evaporation.

More specifically, it is an object to provide a suitable procedure together with a suitably constructed main liquid container for effecting a relatively quick transposition of liquefied gas into a second container arranged to reduce losses due to ebullition by the application of additional pressure during the period of withdrawal to the main body of the liquefied gas.

It is also an object to arrange the main container so as to supply the desired increased pressure by heating a portion of the liquefied gas.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawing, in which:

The figure is a view partly in section and partly in elevation showing an exemplary apparatus constructed in accordance with and adapted for the practice of the process of the present invention.

When it was desired to transfer liquefied gases, particularly those of low boiling points, from one container to another, it has been customary to permit pressure to develop in the closed main container by spontaneous ebullition from the liquid therein. While the pressure so developed in the main container effected a relatively quick transfer of the liquefied gas, nevertheless considerable losses developed by reason of the violent ebullition which took place in the liquid when transferred from the main or storage container to another container.

In accordance with the practice of the present invention, the loss of gas resulting from the old practice is reduced substantially to one-fourth thereof by maintaining the liquefied gas in the storage container preferably at or near its ordinary boiling temperature. When a transfer of liquefied gas is to be made from the storage container to a second, pressure is then applied to the liquid in the storage container from a suitable source. This latter is achieved by supplying a gas under pressure from a suitable source, for example, from an outside gas container, or from a portion of the liquefied gas withdrawn from the storage container and gasified by suitable means, or from another container of liquefied gas. This increase in pressure will enable the liquefied gas to be drawn-off to run out of the storage container at a relatively high rate, and by reason of the low temperature, ebullition takes place relatively slowly, thereby conserving the liquefied gas.

Repeated tests have shown that while the losses conseqent upon the former method amounted to from 2 to 4% of the liquid being transferred, the losses are reduced to from .5 to 1% by the present invention.

It will also be seen that the present invention may be advantageously employed in connection with storage containers adapted to be mounted on trucks for transporting liquefied gas from place to place. In containers thus adapted for transportation, the discharge openings are usually placed at points above the lowest liquid level. In consequence, some evolved gas may be maintained in the containers without substantial pressure during periods of rest, the gas pressure being only applied during the period of draw-off. The gas so introduced above the liquid level in the storage container, however, need not be lost, nor the pressure permanently increased within the container, since this gas may be utilized by the motor of the transport vehicle when starting. Thus it is seen that the pressure is again reduced and the liquefied gas transported substantially without pressure in the storage container while maintaining the liquefied gas at or near its normal boiling point.

Referring now to the drawing, 1 denotes the inner vessel of a storage container suitably insulated and mounted on a truck for transport purposes. This vessel may be of any convenient shape, for example, spherical, as shown, and is provided with a valved draw-off connection 3, the outer end of which is disposed so as to be substantially above the lowest liquid level in the container, this connection being shown as communicating with a second container 5 adapted to receive the liquefied gas at the place of use.

In the form of apparatus here shown, a preferred form for supplying gas under pressure to the storage container is indicated. To this end a conduit or connection 4 is provided for withdrawing a portion of the liquid which is to be gasified and arranged to supply it to the vessel 1 above the normal liquid level. The connection 4 is connected to withdraw liquid from the vessel 1 at any convenient point, for example, through the tapping connection 2, which communicates with the draw-off connection 3, the communication of the other end of the connection 4 with the vessel 1 being at a point near the top.

In order that the connection 4 may generate gas therein, it is provided with a convenient heating means, for example, an area increasing portion or coil 4*a* which is disposed where it will absorb heat. As shown, this is on the exterior of the casing about the vessel 1, where the heat of the atmosphere causes evaporation of the liquid within the coil 4*a* so as to supply pressure to the vessel 1 upon the liquid surface therein, whereby an expulsive force is developed within the container above the liquid level during the period when liquefied gas is being withdrawn. The tapping connection 2 is preferably provided, as indicated, with a suitable valve controlling the rate of flow of liquid into the evaporation coil, whereby the rate of increase in pressure to the vessel 1 is regulated.

Having described my invention, what I claim as new and desire to secure by Letters Patent, is:

1. The process of transferring liquefied gases from one container to another which comprises maintaining a body of liquefied gas in a storage container at a temperature at or near the ordinary boiling point, and when withdrawing liquefied gas therefrom supplying temporarily a re-gasified liquefied gas to the storage container above the normal liquid level therein.

2. The process of delivering oxygen which comprises, transporting to destination liquid oxygen in a container at a relatively low pressure, then during the period of withdrawal supplying a regasified portion of liquid oxygen to increase the gas pressure on said liquid oxygen in said container, and discharging said liquid oxygen under such pressure to another liquid oxygen container to expedite such transfer and to reduce vaporization during such transfer.

3. The process of delivering oxygen which comprises, transporting to destination liquid oxygen in a container at approximately normal boiling temperature, building pressure within said container when desired by regasifying a portion of liquid oxygen had from within said container, applying said pressure to the surface of the liquid in said container, and discharging said liquid oxygen while under such pressure to another liquid oxygen container thereby expediting the transfer and reducing the rate of vaporization during transfer.

4. The process of transferring liquefied gases from one container to another which comprises maintaining a body of liquefied gas in a thermally insulated storage container at a temperature at or near the ordinary boiling point, withdrawing a minor portion of the liquefied gas and supplying heat to evaporate the same, and returning said evaporated portion to said container whereby an increased pressure may be temporarily produced on the liquid within the storage container.

5. The process of transferring liquefied gases from one container to another which comprises maintaining a body of liquefied gas in a storage container at a temperature at or near the ordinary boiling point, withdrawing a portion of the liquefied gas through a channel independent of the main withdrawal, evaporating said portion and supplying temporarily the same to the container above the normal liquid level at a rate sufficient to provide an increased pressure in the container to accelerate the rate of main liquid withdrawal.

6. The process of transferring liquefied gases from one container to another, which consists in maintaining the liquefied gases at their ordinary boiling temperatures in the first container, and utilizing a portion of the liquefied gases from the first container to produce an increased pressure of homogeneous gas on the liquefied gases thereby temporarily to cause the same to flow at increased speed into another container.

7. The process of transferring liquefied gases from one container to another, which consists in maintaining the gases at their ordinary boiling temperatures in the first container, extracting a small quantity of said liquefied gases from said container and evaporating the same, and returning temporarily the vapors to said first container thereby to exert pressure on the liquefied gases and cause the same to flow at increased speed into another container.

8. In apparatus for containing and transferring liquefied gases, the combination with a vessel adapted to hold liquefied gas and provided with a withdrawal connection, of a conduit communicating with said vessel at points both above and below the normal liquid level therein, and means associated with said conduit whereby additional pressure is applied to the surface of the liquid temporarily during periods of withdrawal.

9. In apparatus for containing and transferring liquefied gases, the combination with a vessel adapted to hold liquefied gas and provided with a liquid withdrawal connection, of a conduit communicating with said vessel at points both above and below the normal liquid level therein, and heating means associated with said conduit whereby the portion of liquid withdrawn by said conduit may be gasified and the pressure generated thereby applied to the surface of the liquid in said vessel.

10. In apparatus for containing and transferring liquefied gases, the combination with a vessel adapted to hold liquefied gas and provided with a liquid withdrawal connection, of a conduit communicating with said vessel at points both above and below the normal liquid level therein, said conduit being provided with a portion having an extended surface area, and means for supplying heat to said extended surface area.

11. An apparatus for transferring liquefied gases from one container to another, comprising a vessel having a filler tube arranged for withdrawing liquid, a coil disposed outside of said vessel and adapted to communicate at one end with said tube, the opposite end of said coil being in communication with said vessel above the liquid level, thereby to produce an excess pressure for discharging the liquid from said vessel.

12. An apparatus for transferring liquefied gases from one container to another, comprising a vessel having a filler tube arranged for withdrawing liquid, a coil disposed outside of said vessel and adapted to communicate at one end with said tube, the opposite end of said coil being in communication with said vessel above the liquid level, thereby to produce an excess pressure for discharging the liquid from said vessel, and detachable means for placing said vessel in communication with a second vessel.

13. The process of handling liquid oxygen which comprises maintaining liquid in a container under a gaseous oxygen atmosphere of relatively low pressure, thermally insulating said liquid oxygen to minimize its evaporation, withdrawing a minor portion of said liquid oxygen, supplying heat to regasify said withdrawn portion at relatively high pressure, subjecting temporarily the remaining liquid oxygen in said container to said relatively high pressure, and discharging liquid oxygen from said container under said relatively high pressure.

14. The process of delivering liquefied gas which comprises providing a supply body of liquefied gas in a thermally insulated container, maintaining relatively low self-generated pressure on said liquefied gas during periods of non-use, compressing by the agency of heat a minor portion of said liquefied gas at relatively high pressure during periods of withdrawal, subjecting the remaining liquefied gas in said container to said relatively high pressure, and then discharging said liquefied gas from said container under said relatively high pressure.

15. The process of transferring liquefied gases from one container to another which comprises maintaining a body of liquefied gas in a storage container at a temperature at or near the ordinary boiling point, and when withdrawing liquefied gas from said storage container providing, by the evaporation of liquefied gas, gas material of the same composition in the space above the liquid in said storage container together with heat sufficient to cause the building of pressure in said space, while maintaining the body of liquid in said storage container at a temperature not substantially different from that of said ordinary boiling point.

16. The process of conserving liquid oxygen and transferring the same from a thermally insulated container which comprises storing a body of such liquid oxygen in such container at a temperature approximating its boiling point at relatively low pressure, and expressing liquid oxygen from said container without substantially heating the expressed liquid or the body of liquid remaining in said container by introducing gaseous oxygen directly into the space above the body of liquid in said container at relatively higher pressure and at a temperautre above its condensation point at such pressure.

17. The process of conserving liquid oxygen in and delivering the same from a thermally insulated container which comprises normally storing a body of such liquid oxygen in such container at a temperature approximating its boiling point at a relatively low pressure, and expressing liquid oxygen from said container without appreciably heating and without agitating the body of liquid in said container by introducing gaseous oxygen directly into the space above the body of liquid in said container at relatively higher pressure and at a temperature above its condensation point at the expression pressure.

In testimony whereof I affix my signature.

CHRISTIAN WILHELM PAUL HEYLANDT.

CERTIFICATE OF CORRECTION.

Reissue No. 18,876. June 20, 1933.

CHRISTIAN WILHELM PAUL HEYLANDT.

It is hereby certified that error appears in the printed specification of the above numbered patent requiring correction as follows: Page 1, line 80, for "conseqent" read "consequent"; page 3, line 110, claim 16, for "temperautre" read "temperature"; and that the said Letters Patent should be read with these corrections therein that the same may conform to the record of the case in the Patent Office.

Signed and sealed this 8th day of August, A. D. 1933.

M. J. Moore.

(Seal) Acting Commissioner of Patents.